United States Patent
Hathaway et al.

(10) Patent No.: US 12,101,284 B2
(45) Date of Patent: Sep. 24, 2024

(54) COMPUTERIZED SYSTEM FOR ANALYSIS OF VERTICES AND EDGES OF AN ELECTRONIC MESSAGING SYSTEM

(71) Applicant: Virtual Connect Technologies, Inc., Greenville, SC (US)

(72) Inventors: Benjamin Hathaway, Greenville, SC (US); David Setzer, Greenville, SC (US)

(73) Assignee: Virtual Connect Technoloties, Inc., Greenville, SC (US)

( * ) Notice: Subject to any disclaimer, the term of this patent is extended or adjusted under 35 U.S.C. 154(b) by 0 days.

(21) Appl. No.: 17/536,380

(22) Filed: Nov. 29, 2021

(65) Prior Publication Data
US 2023/0171212 A1    Jun. 1, 2023

(51) Int. Cl.
*H04L 9/40*       (2022.01)
*H04L 51/212*     (2022.01)

(52) U.S. Cl.
CPC ............ *H04L 51/212* (2022.05); *H04L 63/12* (2013.01); *H04L 63/1483* (2013.01); *H04L 63/126* (2013.01)

(58) Field of Classification Search
CPC ....... H04L 51/21; H04L 51/212; H04L 63/12; H04L 63/126; H04L 63/14; H04L 63/1441; H04L 63/1483
See application file for complete search history.

(56) References Cited

U.S. PATENT DOCUMENTS

| | | |
|---|---|---|
| 7,174,368 B2 | 2/2007 | Ross, Jr. |
| 7,302,487 B2 | 11/2007 | Ylonen et al. |
| 7,571,214 B2 | 8/2009 | Schiavone |
| 7,590,698 B1 * | 9/2009 | Cooley ............... G06Q 10/107 709/206 |
| 7,634,810 B2 | 12/2009 | Goodman et al. |
| 7,673,058 B1 * | 3/2010 | White .................. H04L 51/212 709/225 |
| 7,783,711 B2 * | 8/2010 | LeVasseur .......... H04L 63/0428 709/205 |
| 7,865,458 B2 | 1/2011 | Callanan et al. |
| 8,099,598 B1 | 1/2012 | Liu |
| 8,152,022 B2 | 4/2012 | Nygaard-Petersen |

(Continued)

*Primary Examiner* — Khang Do
(74) *Attorney, Agent, or Firm* — Kim and Lahey Law Firm, LLC; Douglas William Kim

(57) ABSTRACT

A computerized system for analysis of vertices and edges of an electronic messaging system comprising: an analytical computer system configured to: receive an electronic message at the network perimeter and sent from a sender's electronic message system outside the perimeter wherein the electronic message is associated with a sender identity and a designated recipient wherein the recipient is within a network perimeter, designating the sender as a first node in a relationship network, designating the recipient as a second node in the relationship network, designating a historic communications pattern between the sender and the recipient as a third node, calculating a confidence value according to the first node, the second node and the third node. The system can create nodes and edges as part of a initial installation or can be connected to an existing system wherein historical data can be used to create nodes and calculate edges values.

16 Claims, 5 Drawing Sheets

(56) References Cited

U.S. PATENT DOCUMENTS

| | | | |
|---|---|---|---|
| 8,205,264 B1 * | 6/2012 | Kailash | H04L 67/02 709/224 |
| 8,341,249 B2 | 12/2012 | Rakowski et al. | |
| 8,392,357 B1 * | 3/2013 | Zou | H04L 51/212 715/752 |
| 8,707,442 B1 | 4/2014 | Lax et al. | |
| 8,839,401 B2 * | 9/2014 | Starink | G06F 21/567 726/11 |
| 9,223,980 B1 * | 12/2015 | Bao | H04L 63/1408 |
| 9,344,394 B2 | 5/2016 | Hardy | |
| 9,501,746 B2 | 11/2016 | Prakash | |
| 9,686,308 B1 * | 6/2017 | Srivastava | H04L 51/00 |
| 9,813,412 B1 * | 11/2017 | Yang | H04L 63/145 |
| 9,916,481 B2 | 3/2018 | Fitzgerald | |
| 10,181,957 B2 | 1/2019 | Srivastava | |
| 10,255,602 B2 | 4/2019 | Wang | |
| 10,291,589 B1 | 5/2019 | Sharifi Mehr | |
| 10,404,745 B2 | 9/2019 | Verma et al. | |
| 10,432,659 B2 * | 10/2019 | Ross | H04L 63/1441 |
| 10,628,797 B2 | 4/2020 | Shraim | |
| 10,708,244 B2 | 7/2020 | Hathaway et al. | |
| 11,019,000 B2 | 5/2021 | Klemm | |
| 11,063,849 B1 * | 7/2021 | Clegg | H04L 67/02 |
| 11,184,337 B2 | 11/2021 | Hathaway et al. | |
| 11,395,109 B2 * | 7/2022 | Harijan | H04W 4/12 |
| 11,456,998 B2 | 9/2022 | Hathaway et al. | |
| 2002/0016913 A1 | 2/2002 | Wheeler et al. | |
| 2003/0018887 A1 * | 1/2003 | Fishman | H04L 67/306 713/151 |
| 2003/0167402 A1 * | 9/2003 | Stolfo | H04L 51/212 726/23 |
| 2003/0229672 A1 | 12/2003 | Kohn | |
| 2005/0182959 A1 * | 8/2005 | Petry | H04L 51/212 726/26 |
| 2006/0021066 A1 | 1/2006 | Clayton et al. | |
| 2006/0095524 A1 * | 5/2006 | Kay | H04L 51/212 709/206 |
| 2008/0120386 A1 * | 5/2008 | Piccinini | H04L 51/02 709/221 |
| 2008/0256187 A1 * | 10/2008 | Kay | H04L 51/212 709/206 |
| 2008/0263670 A1 * | 10/2008 | Stavrica | H04L 51/00 726/24 |
| 2008/0313704 A1 | 12/2008 | Sivaprasad | |
| 2009/0138711 A1 * | 5/2009 | Heimbigner | H04L 51/212 713/176 |
| 2009/0210501 A1 * | 8/2009 | Risher | H04L 63/126 709/206 |
| 2009/0216842 A1 * | 8/2009 | Risher | G06Q 10/107 709/206 |
| 2012/0110085 A1 * | 5/2012 | Malik | G06F 16/2228 709/205 |
| 2013/0067217 A1 * | 3/2013 | Matzkel | H04L 63/083 713/155 |
| 2013/0148653 A1 * | 6/2013 | Howard | G06F 16/955 370/389 |
| 2013/0276017 A1 | 10/2013 | Walker et al. | |
| 2014/0068273 A1 | 3/2014 | Sobel et al. | |
| 2015/0012339 A1 | 1/2015 | Onischuk | |
| 2015/0215252 A1 * | 7/2015 | Rackliffe | H04L 51/212 709/206 |
| 2015/0220718 A1 | 8/2015 | Hong et al. | |
| 2017/0220612 A1 | 8/2017 | Crossley et al. | |
| 2017/0264627 A1 * | 9/2017 | Hunt | H04L 63/1425 |
| 2017/0316220 A1 * | 11/2017 | Eldar | G06F 21/602 |
| 2017/0338967 A1 | 11/2017 | Lewison et al. | |
| 2018/0013710 A1 * | 1/2018 | Khan | H04L 51/212 |
| 2018/0013725 A1 * | 1/2018 | Kagarlitsky | H04L 51/066 |
| 2018/0054414 A1 * | 2/2018 | LeVasseur | G06Q 10/10 |
| 2018/0082678 A1 * | 3/2018 | Olmstead | G10L 25/63 |
| 2018/0167221 A1 | 6/2018 | Kalan et al. | |
| 2018/0359222 A1 * | 12/2018 | Hathaway | H04L 63/045 |
| 2019/0087428 A1 * | 3/2019 | Crudele | H04L 51/212 |
| 2019/0173892 A1 * | 6/2019 | Kemp | H04L 63/1408 |
| 2019/0182273 A1 * | 6/2019 | Walsh | H04L 63/1425 |
| 2019/0260780 A1 | 8/2019 | Dunn | |
| 2019/0318653 A1 * | 10/2019 | Shi | H04L 63/0227 |
| 2020/0007502 A1 * | 1/2020 | Everton | H04L 51/063 |
| 2020/0067861 A1 * | 2/2020 | Leddy | G06F 21/6245 |
| 2020/0110623 A1 * | 4/2020 | Vangala | G06F 3/0483 |
| 2020/0169483 A1 * | 5/2020 | Kursun | G06Q 20/3678 |
| 2020/0244606 A1 * | 7/2020 | Rodriguez | G06F 16/24578 |
| 2020/0349573 A1 * | 11/2020 | Dong | G06N 5/022 |
| 2020/0349586 A1 * | 11/2020 | Deng | G06N 5/04 |
| 2021/0150598 A1 * | 5/2021 | Guillon | G06Q 10/10 |
| 2021/0168161 A1 * | 6/2021 | Dunn | H04L 63/1441 |
| 2021/0240836 A1 * | 8/2021 | Hazony | G09B 5/00 |
| 2021/0250317 A1 * | 8/2021 | Kras | H04L 9/083 |
| 2021/0329007 A1 * | 10/2021 | Pearce | H04L 51/23 |
| 2021/0344710 A1 * | 11/2021 | Kras | G09B 19/00 |
| 2022/0014543 A1 * | 1/2022 | Jakobsson | H04L 63/123 |
| 2022/0045995 A1 | 2/2022 | Hathaway et al. | |
| 2022/0400094 A1 * | 12/2022 | Sampath | H04L 51/214 |

\* cited by examiner

COMPUTERIZED SYSTEM FOR ANALYSIS OF VERTICES AND EDGES OF AN ELECTRONIC MESSAGING SYSTEM

BACKGROUND OF THE INVENTION

1) Field of the Invention

This system is directed to a computerized system for the analysis of transmitted electronic information from a sender to a recipient including the analysis of electronic messaging, edge values, confidence values, and recommended and automated message actions and events.

2) Description of the Related Art

The use of electronic message, especially email, is prevalent in today's society. It is estimated that billions of emails are sent per day. Email is being used for several purposes including personal communications, business communications, marketing, advertising, multi-party communications, collaboration, transmitting attachments, document or any other information interactions, and many other uses. Some of the uses that use email include undesirable uses such as phishing attempts, spam, and other undesirable and even illegal activities. Generally, phishing refers to an attempt to gather private, confidential, or protected information by social engineering which seeks to have potential victims disclose sensitive information under false pretenses. Phishing attacks are usually carried out via communication channels such as email or instant messaging by fraudulent or misleading actors posing as legitimate and trustworthy entities so that the victim "trust" the bad actor and discloses such information. It is desirable to identify threatening attempts to gain sensitive information or otherwise cause harm, including phishing attempts, early so that these attempts can be identified, and remedial action taken prior to the attempt being placed in each target recipient's inbox.

There have been attempts to automatically filter or identify undesirable electronic messages such as shown in U.S. Pat. No. 9,501,746 which discloses a system related to detecting bad actors impersonate other people's identity in order to increase the likelihood of recipients opening these bad actors' messages and attachments. This patent states that this undesirable activity is generally referred to as "phishing" and specifically "spear phishing" when the recipient is targeted by the fake sender who is referred to as a "phisher". This patent also states that these phishers send these "fake emails" seeking to increase their likelihood of successfully gaining unauthorized access to confidential data, trade secrets, state secrets, military information, and other information. The motivation of these phishers is typically for financial gain through fraud, identity theft and/or data theft as well as those which wish to disrupt normal operations. Phishing attempts have been associated with private entities as well as being state sponsored and even foreign government themselves.

When these undesirable actions are taken, it would be advantageous to identify this undesirable activity at an enterprise level so that the undesirable actions, such as a phishing attempt, can be identified, filtered, quarantined, or other action taken without the undesirable electronic message being received by each target of the undesirable action. Once attempt to detect and/or handle targeted attacks is show in U.S. Pat. Nos. 9,686,308 and 10,181,957 disclose a system for detecting and/or handling target attacks in an enterprise's email channel. This patent discloses receiving aspects of an incoming electronic message addressed to a first email account holder, selecting a recipient interaction profile and/or a sender profile from a plurality of predetermined profiles stored in a memory, determining a message trust rating associated with the incoming email message based upon the incoming email message and the selected recipient interaction profile and/or the sender profile; and generating an alert identifying the incoming email message as including a security risk based upon the determined message trust rating. However, these techniques are limited to the message being received by the electronic message system and limited to the relationship between the sender and the recipient. It would be advantageous to have a system that can intercept an electronic message at the perimeter of the network rather than at the electronic message server. Allowing the electronic message to arrive at the recipient's system increase risk and does not provide for true enterprise-wide protection for such undesirable actions as phishing attempts.

Another attempt to detect, prevent and provide notification of phishing attempts is shown in U.S. Pat. No. 7,634,810 which discloses a phishing detection module that detects a phishing attack in the communication by determining if the domain of the message source is similar to a known phishing domain, or by detecting suspicious network properties of the domain. This attempt requires that information about the message domain is known allowing bad actors to simply change domains to overcome this system.

Another attempt to detect, prevent and provide notification of phishing attempts is shown in U.S. Pat. No. 10,404,745 which discloses the use of natural language techniques and information present in an email (namely the header, links, and text in the body) to detect phishing. This system is limited to an analysis of the email itself.

Therefore, it is an object of the system to provide for a system that can identify undesirable electronic communications using comprehensive information, not just the sender, recipient, and the content of the suspect message.

It is another object of the system to identify suspect message without the suspect message being delivered to each targeted recipient.

It is another object of the system to identify suspect message and allow remote system to benefit from the analysis of the suspect message without having to be in the same system as the one conducting the message analysis.

BRIEF SUMMARY OF THE INVENTION

The above objectives are accomplished by providing a computerized system for analysis of vertices and edges of an electronic messaging system that can include an analytical computer system that can be configured to receive an electronic message sent from a sender's electronic message system at a network perimeter wherein the electronic message is associated with a sender identity and a designated recipient, designate the sender as a first node in a relationship network, designate the recipient as a second node in the relationship network, determine an edge value associated with the first node and the second node according to attributes taken from the group consisting of a sender identification, recipient identification, a message time, an IP address associated with the electronic message, a reverse DNS associated with the IP address, a geographic region associated with the sender, a domain associated with the sender, a sender electronic message client, a size of the electronic message, a velocity associated with the electronic message, an attachment to the electronic message, electronic messaging character encoding and any combination thereof, and; perform an action associated with the electronic message according to the edge value taken from the group consisting of reporting the electronic message as spam to an administrator of the analytical computer system, moving the electronic message to a spam folder on an electronic message server, transmitting a notification that an email has been sent to the recipient, moving the electronic message out of the spam folder, quarantining the electronic message and any combination thereof.

The geographic region associated with the sender can be a sender device geographic region, sender IP geographic region and any combination. The IP geographic can be the physical location of the sender's device or a node of a network used by the sender. The electronic message can include retrieving the electronic message from an electronic message server prior to delivery of the electronic message to a recipient client. The analytical computer system can be configured to create a set of rules taken from the group consisting of adding the sender to a white list, adding the sender to a blocked list, allowing a sender's domain to a white list, blocking the sender's domain, allowing a sender's IP address to a white list, blocking the sender's IP address, adding the sender's geographic region to a white list, blocking the sender's geographic region, and any combination thereof. The electronic message can be provided to a recipient's client and the recipient's client is configured to determine electronic message status according to attributes taken from the group consisting of the electronic message was opened, the electronic message was not opened, the electronic message was deleted, the electronic message was moved to a non-inbox folder, a reply was generated to the electronic message, the recipient unsubscribed, the electronic message is on a blocked list, and any combination thereof. The analytical computer system can be is configured to retrieve electronic message from a mail server and modify the edge value associated between the first node and the second node according to the retrieved electronic messages. The analytical computer system can be configured to modify the edge value according to a set of electronic messages transmitted between a sender's client and the recipient's client. The analytical computer system can be configured to retrieve a relationship information between the sender and the recipient from a third-party computer system and determine an edge value associated between the first node and the second node according to the relationship information.

The third-party computer system can be taken from the group consisting of a social media computer system, scheduling computer system, access control computer system, white list computer system, black list computer system, and any combination thereof. The third party computer system can provide additional information concerning the interaction between the sender, recipient, domain, message system, message, subject matter and the like.

The network perimeter can be a first network perimeter, the electronic message is a first electronic message, and the recipient is a first recipient; a second electronic message sent to a second recipient that is included in a second network wherein the first network is not connected to the second network; and, the analytical computer system can be configured to determine an edge value associated between the first node and the second node according to the second electronic message. The network perimeter can be the physical or virtual boundary of a system such as a mail server, communications server or IP address. The network perimeter is a first network perimeter, the electronic message is a first electronic message, the recipient is a first recipient, and the edge value is a first edge value, a second electronic message sent to a second recipient that is included in a second network wherein the first network is not connected to the second network; a second edge value associated with the first sender and a third recipient; and, the analytical computer system is configured to determine the edge value associated between the first node and the second node according to the second edge value.

The analytical computer system can be configured to determine an edge value associated between the first node and the second node according to a velocity associated with the electronic message. The analytical computer system can be configured to determine an edge value associated between the first node and the second node according to a set of recipients receiving similar versions of the electronic message. The analytical computer system can be configured to determine a confidence value according to the edge value; The analytical computer system can be configured to modify the edge value between the first node and the second node according to a volume of electronic message send between the sender and recipient.

The computerized system can include an analytical computer system configured to: receive an electronic message sent from a sender's electronic message system wherein the electronic message is associated with a sender identity and a designated recipient, designating the sender as a first node in a relationship network, designating the recipient as a second node in the relationship network, and, determining a confidence value of the electronic message according to an edge value associated with the first node and the second node.

The electronic message can be is a first electronic message; the recipient can be a first recipient; the confidence value can be a first confidence value; the analytical computer system can be the first second analytical computer system configured to transmit the first confidence value to the second analytical computer system; and, wherein the second analytical computer system is configured to receive a second electronic message from the sender's electronic message system wherein the second electronic message is associated with the sender identity and a second designated recipient, associate a third node with the second recipient, determine a second confidence value of the electronic message according to the first confidence value and a second edge value associated with the first node and the third node.

The edge value can be a first edge value and, the second analytical computer system can be configured to determine a second edge value between the first node and a fourth node where in the fourth node is associated with a public account associated with the second recipient and the second confidence value is determined according to the second edge value.

The system can include an analytical computer system configured to: receive an electronic message sent from a sender's electronic message system wherein the electronic message is associated with a sender identity and a designated recipient, designating the sender as a first node in a relationship network, designating the recipient as a second node in the relationship network, designating a historic communications pattern between the sender and the recipient as a third node, calculating a confidence value according to the first node, the second node and the third node. The analytical computer system can generate an action from the group consisting of reporting the electronic message as spam to an administrator of the analytical computer system, moving the electronic message to a spam folder on an electronic message server, transmitting a notification that an email has been sent to the recipient, moving the electronic message out of the spam folder, quarantining the electronic message and any combination thereof and transmitting the action to a recipient's electronic message system. The analytical computer system can be configured to create a set of rules taken from the group consisting of adding the sender to a white list, adding the sender to a blocked list, allowing a sender's domain to a white list, blocking the sender's domain, allowing a sender's IP address to a white list, blocking the sender's IF address, adding the sender's geographic region to a white list, blocking the sender's geographic region, and any combination thereof. The analytical computer system can be a first analytical computer system and is configured to send the set of rules to a second analytical computer system. The analytical computer system can be configured to store the set of rules on a remote database. The remote database can be immutable ledger such as blockchain.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
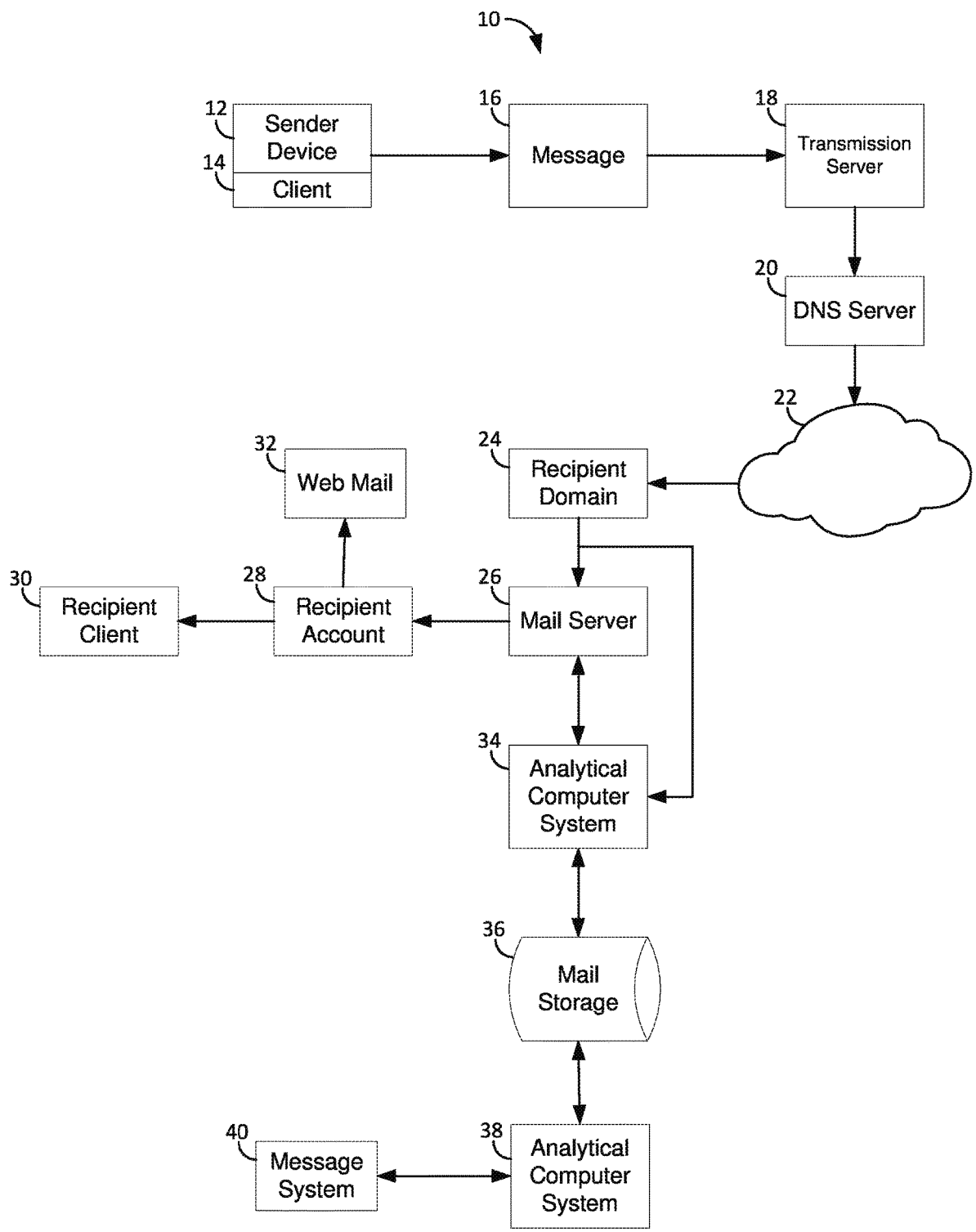
FIG. 1 is a schematic of aspects of the system.

Referring to FIG. 1, and using an email system as an example, a sender's network system shown generally as 10. The sender computer device 12 can include an email client 14. Typically, the sender composes an electronic message 16 that is transmitted through a transmission server, 18 such as an SMTP server, and then directed by a domain name system (DNS) 20. The domain name system can provide information where to send the electronic message through a global communications network 22. The electronic message is then transmitted to a domain 24 of the recipient, on to a mail server 26 and then to the recipient account 28 and recipient client 30. In some embodiments, the recipient can access the user account through a browser such as webmail 32.

The analytical computer system 34 can intercept incoming electronic messages from the recipient's domain, intercept electronic message prior to the electronic message being delivered to the recipients account or retrieved from the mail server. The analytical computer system can include computer readable instructions that can determine the sender, sender's domain, recipient, and recipient's domain from the electronic message. As discussed below, the analytical computer system can be configured to create a confidence value for the electronic message and store the confidence value for the electronic message on a database 36 such as an immutable ledger. A second analytical computer system 38 can access the database as well as be on communication with a second electronic communications system such as a second email system 40. This structure allows for the analysis of the first analytical computer system to be shared with a second analytical computer system so that the second analytical computer system benefits from the information gathered, created, and used by the first analytical computer system. Further, the second email system 40 can benefit from the benefits from the information gathered, created and used by the first analytical computer system and the first message system.

Figure 2:
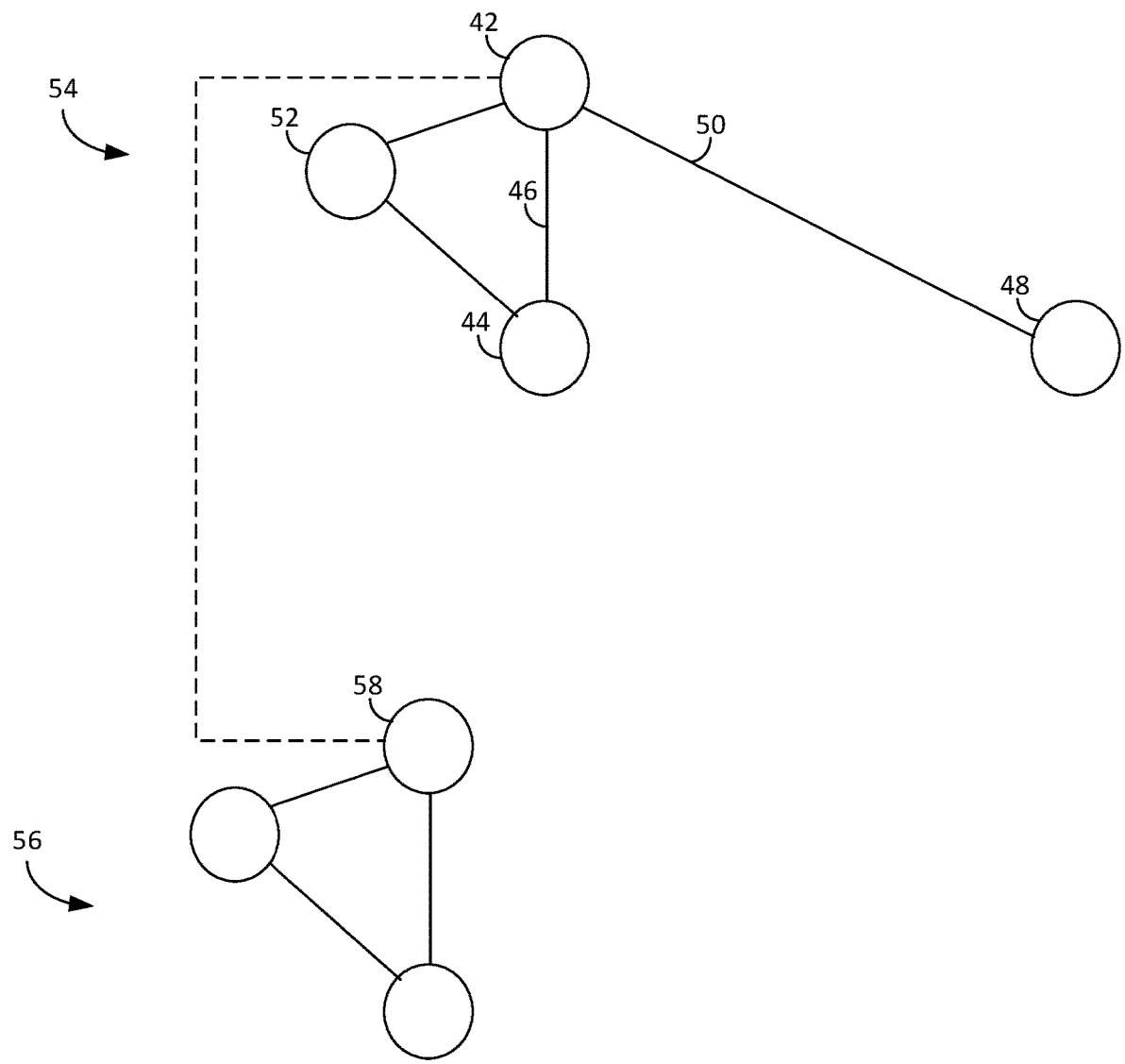
FIG. 2 is a schematic of aspects of the system.

Referring to FIG. 2, the analytical computer system can be configured to designate the sender of the electronic message a first node 42. The recipient can be designated a second node 44. A first edge 46 can be defined between the first node and the second node. This edge can include an edge value that can be determined according to several inputs and factors. These inputs an factors can include the number of time that the sender and the recipient send each other electronic message, the number of times that the recipient responds to the sender's electronic message, the domain where the sender's electronic message originates, the message time, the IP address associated with the electronic message, the reverse DNS associated with the IP address, the geographic region associated with the sender, the domain associated with the sender, the sender electronic message client, the size of the electronic message, a velocity associated with the electronic message, an attachment to the electronic message, electronic messaging character encoding and any combination thereof. The velocity associated with the electronic message can include the number of the same or similar message that are sent during a time frame to multiple recipients, including multiple recipients of the same electronic message system. In one embodiment, the edge value can include a range. In one embodiment, the inputs and factors can increase or decrease the edge value. For example, if the geographic region associated with the sender is a known source of phishing attempts, the edge value can be decreased. The amount of the magnitude of the can be dependent upon the specific geographic region. A geographic region known for frequent phishing attempts will have a larger magnitude decrease to the edge value that that of a lower risk area. The edge value can be increased when the geographic region associated with the sender has a higher trust.

In one embodiment, the actions of the recipient can increase or decrease the edge value between the first node and the second node. For example, if the sender frequently sends message to the recipient and the recipient frequently replies, the edge value can be increased. If the recipient frequently moves electronic messages from the sender to the "junk" folder, the edge value can be decreased.

The analytical computer system can also determine if the same or similar messages are sent to a second recipient that can be associated with a third node 48. A second edge value 50 can be associated between the first node and the second node. If a electronic message is sent to the second node and the third node about the same time and with the same content, the edge values can be decreased as such activity may be associated with spam, or other undesirable activity. In one embodiment, if both recipients' response, the corresponding edge values can be increased indicating that the electronic message threat risk is lower. From the edge values a confidence score can be generated. A confidence score can be associated with the sender, as well as the electronic message, the domain where the sender's electronic message originates, the IP address associated with the electronic message, the reverse DNS associated with the IP address, the geographic region associated with the sender, the sender electronic message client, and any combination thereof. The edge values and confidence scores can be used by the analytical computer system or the electronic message system to take action on the electronic message. For example, an electronic message with a high confidence score can be transmitted to the inbox. An electronic message with a low confidence score can be marked for review, placed in quarantined, deleted, or other action.

The analytical computer system can receive information concerning the sender and the recipient from third party sources. For example, the analytical computer system can determine from social media that the sender and the recipient are friends. If this is the case, the edge value between the first node and the second node could be increased, as there is a higher likelihood that the electronic message is not undesirable. The analytical computer system can designate a social media platform as a fourth node 52 and edge values between the first node and the fourth node and the second node and the fourth node can be determined. These edge values can be used to determine the confidence score of the sender and/or the electronic message.

The system also has the ability to use the confidence score of one system and its transactions to inform another system of edge and confidence scores. This can remedy the issue when a new message system is implemented, and the implantation wishes to avoid the null graph. For example, a first enterprise 54 can calculate edge values and nodes for that enterprise system. The enterprise system can be associated with a first company. The analytical system can be used with this first enterprise system. A second enterprise 56 can be in communications with the analytical system. The second enterprise can include a node 58 that can be associated with the sender of the first enterprise (e.g., the same sender). A confidence value associated with the first sender (node 42 in the first enterprise) can be used when a message is received from the same sender (node 58 in the second enterprise) to a recipient in the second enterprise so that the second enterprise has initial information concerning the sender, even when the sender is sending a message to a recipient in the second enterprise for the first time. In one embodiment, the recipient in the second enterprise can be a recipient in the first enterprise so that the edge value between the sender and recipient can be used in the second enterprise when the sender sends a message to the recipient in the second enterprise for the first time. This situation can occur when the recipient has a first address for the first enterprise and a second address for the second enterprise.

Figure 3:
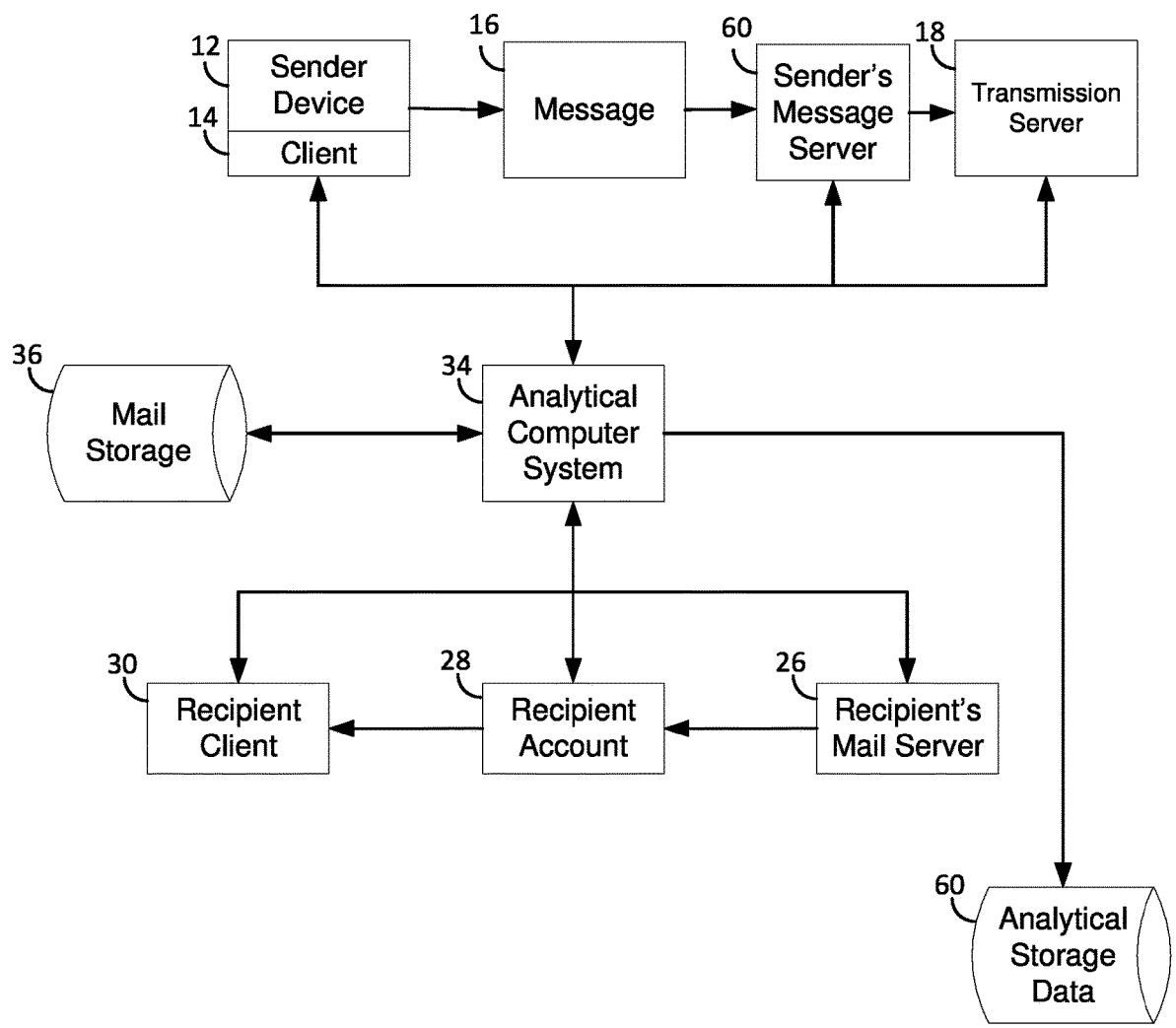
FIG. 3 is a schematic of aspects of the system.

Referring to FIG. 3, in one embodiment, the analytical system 34 can be in communications to an existing message system of the sender. The sender can use device 12 or client 14 to create a message 16. The message can be sent to a sender message server 60 and/or transmission server 18, which can be the same or separate servers. The analytical system 34 can retrieve messages and message data from the sender's device 12, sender's client 14, sender's server 60 a transmissions server 18 and any combination. The message data can include message content, message metadata, and other message information from the sender's message server.

The analytical system 34 can be in communications to an existing message system of the recipient including a recipient's mail server 26, recipient's account 28 and recipient's client 30. The analytical system 34 can retrieve messages data that can include the message content, message metadata, and other message information from the recipient's message server, analyze the information, create nodes, create edges, calculate edge values, and calculate confidence values from the message data. Included in this process is the creation of a node for one or more senders and one or more recipients. When the recipient receives a message the edge values associated with the sender and the recipient, and the confidence values can be pre-existing from historical message data. The edge values and confidence values can be stored in a database, including an immutable ledger, and used in the future or by other systems.

The analytical system can be in communications with a message database 36 that can be included in the message system or can be remote from the message system, such as with a backup or data duplication system.

When the analytical system is in communications with the sender's system, recipient's system or third-party system, the analytical data can use this existing message data and analyze the data, create nodes, create edges, calculate edge values, and calculate confidence values from the data. Included in this process is the creation of a node for one or more senders and one or more recipients. When the sender sends the next message the edge values and confidence values can be pre-existing from historical message data. The edge values and confidence values can be stored in a analytical storage database 60, including an immutable ledger, and used in the future for the same system or by other systems. Once a sender and recipient node are created, the analytical system can retrieve third party data, such as social media accounts, and use this information to increase or decrease the edge values, which in turn will increase or decrease the confidence values.

In one embodiment, the analytical system can intercept incoming message at the network perimeter without the message being sent to the message server. The analytical system can intercept the message at the mail transport agent (such as a POP3/IMAP server) so that the message can be analyzed at the network perimeter. In one embodiment, the network perimeter is the actual or virtual location where communications enter and exits the internal network. For example, if there is a local area network, the network perimeter could be the location of the firewall. If a recipients' device is a portable computer device such as a smart phone, the network perimeter can be the location where messages are received by the mail server associated with the recipient's portable computer device. Generally, the network perimeter can be the boundary between the local or internal network and the public facing portion of a network. The network perimeter can be the location where an intrusion detection system is located at points along or within a network. More generally speaking, the network perimeter can be the location where the information accessible and provided to a user is controlled. The network perimeter can be the access points that are controlled so that the information that is transmitted into the network can be controlled. The network perimeter can be the boundary between a secured internal network and uncontrolled external networks or devices.

The analytical system can retrieve the incoming message as determine the next course of action according to a set of confidence protocols. The confidence protocols can include the following: allow the message to continue to the message system, flag the message with a warning, delete the message, quarantine the message, highlight the message, remove links, remove attachments, scan links, scan attachments, preform link actions, preform attachment actions, add notification, forward, reply and any combination. The analytical system can communicate with the email system to automatically perform one or more of these tasks including halting the message from being received by the message system at the perimeter. The warning can be a visual indicator that can include different levels such as a first level being a light warning, a second level being a moderate warning and a third level being a heavy warning. The warnings can be indicated with colors such as yellow, orange and red. In the event that there are links in the message, the links can be scanned for potential threats or other effects. For example, if the content of the link indicates a first link location and the actual URL indicates a second link location different than the first link locations, a warning can be generated concerning the link. The link can also be removed from the message and the message allowed to enter the message system with an indication that the link was removed. The link can be quarantined and associated with the message so that if the user wishes to use the link, it would be available even when removed from the message. In the event that the link is removed, it can decrease the edge score associated with the sender and recipient. This can result in a reduction of the confidence score of messages from the sender. This can also reduce the edge score of a message between the sender and any recipient having the same link, including messages from different senders. Concerning an attachment, the attachment can be scanned for anti-malware using an internal system of external system. If malware is detected, the analytical system can generate a warning concerning the attachment. The attachment can also be removed from the message and the message allowed to enter the message system with an indication that the attachment was removed. The attachment can be quarantined and associated with the message so that if the user wishes to review the attachment, it would be available even when removed from the message. If the attachment is removed, it can decrease the edge score associated with the sender and recipient. This can result in a reduction of the confidence score of messages from the sender. This can also reduce the edge score of a message between the sender and any recipient having the same attachment, including messages from different senders. In the event that a recipient or other user access a removed link or removed attachment, the edge score can be increased which may increase the confidence score associated with the sender or with the associated link or attachment. A message action can be any action or inaction taken by the recipient or the system related to the message, its contents, a link, an attachment or any combination.

When the sender sends the first electronic message to the recipient, the edge value between the first node and the second node can be lower. The more that the sender and the recipient communicate, the more that the edge value between the first node and the second node increases. When the sender sends the first electronic message to the second recipient, the edge value between the first node and the third node can be lower. The more that the sender and the recipient communicate, the more that the edge value between the first node and the third node increases. As these edge values increase, the confidence value associated with the sender can increase. Therefore, the analytical computer system can use machine learning to determine the confidence value and therefore the potential risk of a sender and/or an electronic message. Further, as the analytical computer system can review many nodes, the data that is accessible to the analytical computer system can be millions or more a day. This data set includes the sender and recipient's actions as well as the properties associated with the sender and the recipient. For example, if an organization has many employees and a majority of the employees receive and respond to messages from a sender, the edge values and the confidence value associated with the sender can be increased based upon the sender's communications with the enterprise. The enterprise may, therefore, have a higher trust (e.g., lower risk) associated with electronic message from that sender. The confidence value can be stored on a database, such as an immutable ledger. The confidence value can then be retrieved from the database from a second analytical computer system and therefore second electronic message system so that the second electronic message system need not to "rebuild" the edge values and confidence value of the sender or the sender's electronic message. The second analytical computer system and second electronic message system can use the edge values and confidence value from the first analytical computer system and first electronic message system as starting point and can subsequently define and modify its own edge values and confidence values. One enterprise may have a higher or lower confidence value associated with a sender than another even when the second analytical computer system and second electronic message system retrieve the initial edge values and/or confidence values. Using the analytical computer system this system can mimic human behavior by using vast amounts of data. By using the actions of the recipient, the analytical computer system can determine if an electronic message should be placed in the inbox, deleted, marked as suspicious, quarantined, or other action mimicking human behavior. Because the system can potentially have accessed the electronic message of the enterprise and even remote enterprises (via the database), the system can provide functionality that is not possible by a human alone but can be provided by the machine learning process.

In operation the maximum number of edges possible in a single graph with n vertices is:

$$^nC_2 = \frac{n(n-1)}{2}$$

In one embodiment, the first node can be the sender email address and the second node can be the recipient email address. The edge between the first and second node can be in a range of −100 to 100. A set of events can be used to calculate the edge score wherein each event is assigned a value. For example, an event where the recipient opens the first message from the sender an initial edge score can be assigned such as a positive number (e.g., in the range of 1-10). If the recipient deletes the initial message from the sender the initial edge score can be a negative number (e.g., −1 to −10). According to the first event, a edge count can be assigned to the edge so that when the recipient take action on the first message, the count can be one (1). If the recipient opens a second message from the sender, the count can be increased by 1 and the edge score can be increased by a positive number. In one embodiment, the edge score can be the average of the edge scores according to the following:

$$E_t = \frac{\Sigma_1^n E_n}{n}$$

wherein n is the total number of message actions and $E_n$ is the affect of the edge score for action n. As the system receives more message actions, the edge score becomes the qualitative average of values associated with message actions taken resulting in an overall edge score. The confidence score can be calculated taking into consideration the value of message actions so that the higher the number of message actions, the higher the edge score could be.

In one embodiment, certain actions have a larger effect on the edge score. For example, when malware is detected in an attachment, the negative effect on the edge score can be much higher than if the recipient simply deletes the message. In this embodiment, the total edge score can be modified with weighted individual values as shown below:

$$E_t = \frac{\sum_{i=1}^{n} w_i X_i}{\sum_{i=1}^{n} w_i}$$

wherein $E_t$ is the weighted edge score, n is the number of message actions, $w_i$ is the weight applied to the particular message and X, is the edge score for the particular message value. For example, detecting a virus in an attachment may have a much higher weight than that of deleting the message.

In one embodiment, the calculation of the edge value can be biased to recent activity of the recipient, the message data or other information. For example, the edge value can be calculated using a rolling or moving average of a certain number of historical message actions as shown below:

$$E_k = \frac{1}{k} \sum_{1=n-k+1}^{n} E_n$$

Wherein k is the last message action value in a set of n action values. The rolling or moving average can also include the weights associated with each message action.

The analytical computer system can be configured to allow for supervised machine learning. The calculations for the edge values and confidence values can be governed by a set of rules that are pre-determined. For example, the rules could state that if the sender and recipient exchange X number of messages over a Y period of time, the edge value should be increased by Z. The confidence value can be based upon the edge value and therefore based upon the pre-established rules. Examples of the pre-determined rules that can be established include the following in Table 1:

TABLE 1

| Action/Events that may increase edge values and confidence values. | Action/Events that may decrease edge values and confidence values. |
|---|---|
| Recipient sends response electronic message | Electronic Message is reported as spam |
| Electronic message is moved out of a spam folder | Electronic message is moved to a spam folder |
| Electronic message is released from quarantine/spam | Geographic region known for undesirable electronic messages |
| An allow rule is added for the sender's address | A block rule is added for the sender's address |
| An allow rule is added for sender's domain | A block rule is added for the sender's domain |
| An allow rule is added for the sender's IP address | A block rule is added for the sender's IP address |
| An allow rule is added for the sender's geographic region | A block rule is added for the sender's geographic region |
| The electronic message is opened by the recipient | The recipient request to unsubscribe in response to the electronic message |
| The electronic message is received from an internal sender. | The electronic message received from a blocked list |
| The time between the message receipt and message open is short. | The time between the message receipt and message open is long. |
| A link is allowed and/or "clicked" by the recipient. | A link is marked with warning or removed |
| An attachment is allowed and opened. | An attachment is marked with a warning or removed. |

In one embodiment, examples of positive message actions and their respective values is shown in Table 2:

TABLE 2

| Action/Events that may increase edge values and confidence values. | Negative Value Range | Range of Weights |
|---|---|---|
| Recipient sends response electronic message | 0-25 | 0-5 |
| Electronic message is moved out of a spam folder | 10-25 | 0-10 |
| Electronic message is released from quarantine/spam | 15-30 | 5-25 |
| An allow rule is added for the sender's address | 10-30 | 10-20 |
| An allow rule is added for sender's domain | 25-50 | 10-20 |
| An allow rule is added for the sender's IP address | 25-50 | 10-20 |
| An allow rule is added for the sender's geographic region | 10-30 | 10-20 |
| The electronic message is opened by the recipient | 0-10 | 0-5 |
| The electronic message is received from an internal sender. | 10-20 | 0-5 |
| The time between the message receipt and message open is short. | 0-5 | 0-5 |
| A link is allowed and/or "clicked" by the recipient. | 0-5 | 0-5 |
| An attachment is allowed and opened | 0-10 | 0-5 |

The message action that affects the edge score negatively can correspond to the values above or can be outside the ranges above. For example, is a message is identified has having a link or malware that is a denial or service attack, the edge value can be set to −100 or the maximum negative value allowed.

The system can use the edge values to associate a confidence value with a sender, message, message system, domain, geographical location, and recipient. For example, in the case of a sender, the node associated with the sender can have edges with the recipient, domain, geographic location, social media, whitelists, grey lists, blacklists, message systems, and the like.

When determining a confidence value, the confidence value can be calculated according to edge values associated with a node as shown below:

$$C_t = \sum_{n=1}^{n} E_n$$

where $E_n$ is the edge value for edge n. The confidence value can be a sum of the edge values, a weighted sum of the edge values, an average, a weighted average, a rolling average of any combination thereof.

Figure 4:
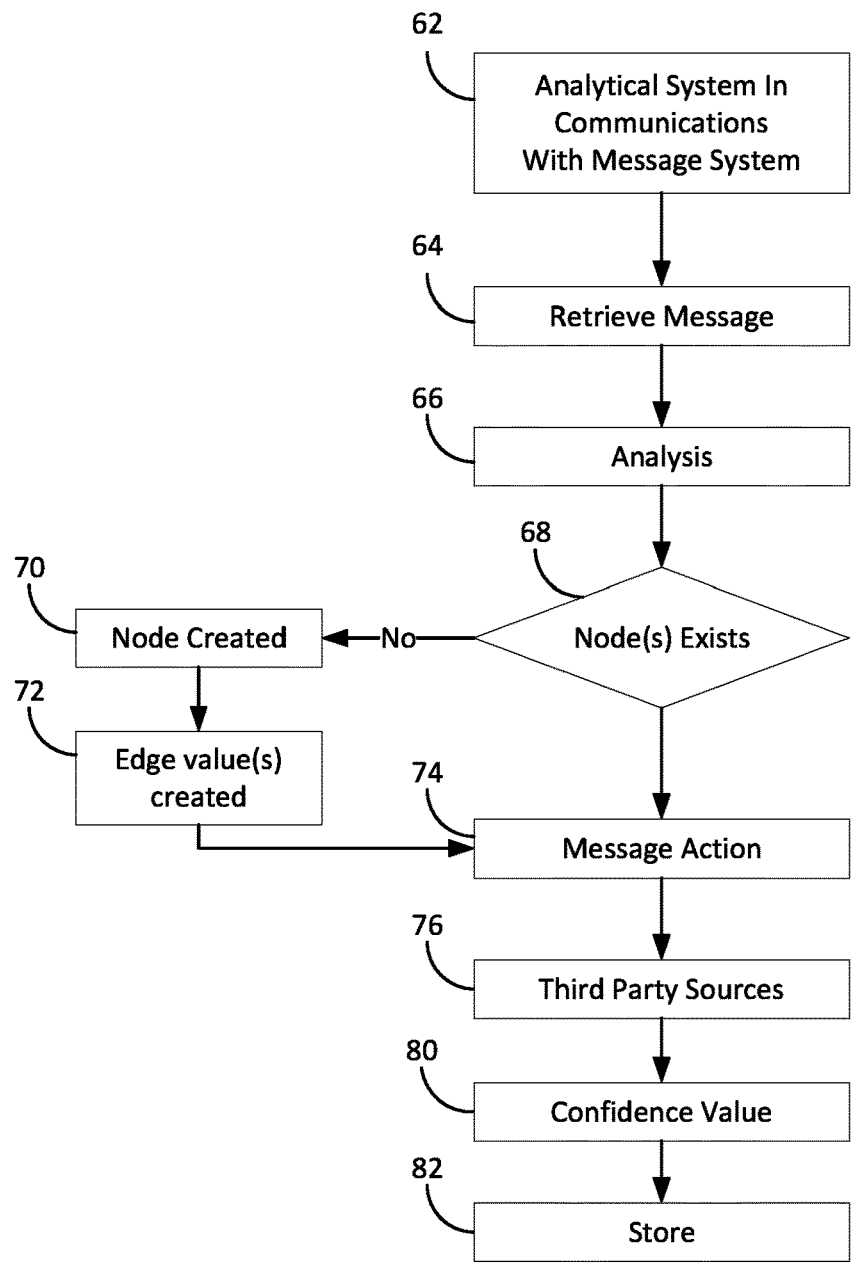
FIG. 4 is a flowchart of aspects of the system.

Referring to FIG. 4, one embodiment of the system can begin with the analytical system being placed in communications with a mail system at 62. The analytical system then accesses or retrieves a message at 64. The system analyzes the message at 66 and determine the sender, receiver, domain, contents, metadata, status (opened, deleted, quarantined, responded to, archived, ignored, marked spam, and the like). The system can determine if there are existing nodes associated with the sender, recipient and other aspects of the message at 68. If one or more nodes are not present, the corresponding node is created at 70. For examples, of the recipient is new to a company, a node for that recipient can be created. Edge value(s) can be created between the node and other existing nodes at 72. A message action is determined at 74 and the edge value increased, unaffected or decreased according to the message action associated with the message and/or the node(s). The system can retrieve information from third party sources associated with one or more nodes, such as social media, that can be used modify the appropriate edge value. The edge values can be used to create a confidence score at 78 associated with a node, message, or other components as stated herein as 80. The nodes, edge values and confidence score can be stored at 82. The storage can be locally, wide area, immutable and any combination. This process can be used to develop edge values and confidence values from historical data or can be used to create, modify and manage edge values and confidence values from the present and forward.

Figure 5:
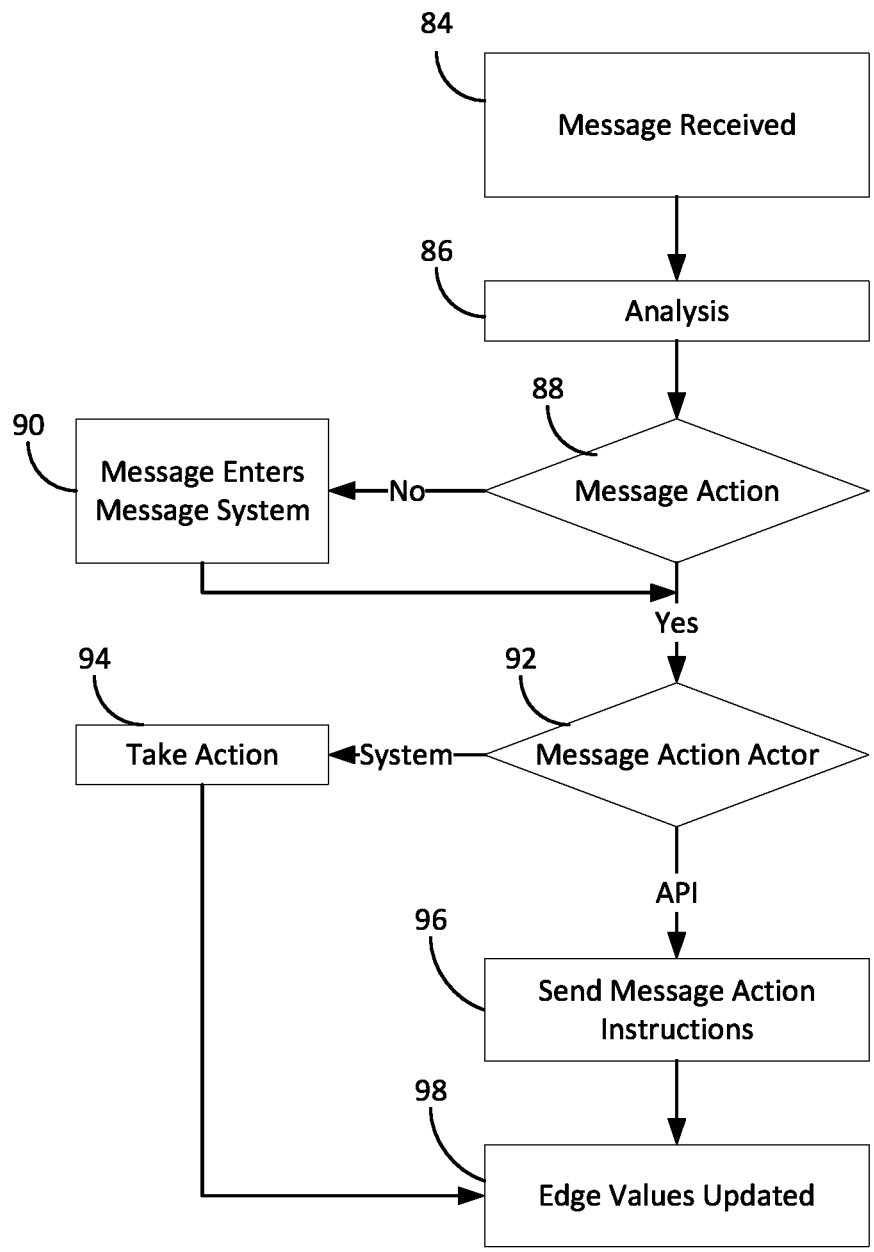
FIG. 5 is a flowchart of aspects of the system.

Referring to FIG. 5, the message received at 84. The message can be received by being retrieved from an existing system, retrieved from a database, or received from a sender. The message can be intercepted prior to the message being received by the message system or contemporaneously with or after the message is received by the message system. When received, the message can be analyzed at 86 using the edge value(s) or the confidence value(s) associated with attributes of the message such as the sender, message, link, attachment, recipient, or any combination. According to the edge value or confidence value as well as user defined setting and processes, a message action can be determined at 88. If no action is to be taken, the message can be allowed to enter the message system at 90. If there is a message action to be take, a determination is made at 92 where the message action is to take place. If the actor is the analytical system the message action is taken at 94 (e.g., delete the message, allow the message to continue or other action). If the message action is to be sent to the message system (e.g., through an API), the message action is sent at 96. According to the action, or inaction, taken, the appropriate edge values can be modified at 98.

The system described herein is directed to a series of acts that can protect a computer or computer system from electronic communication that may contain malicious code of other undesirable content. The computerized system is one that is at least directed to a process. The system can identify and potentially isolate electronic messages in an electronic message system according to the edge value and/or the confidence values. The edge value and confidence values associated with a sender or electronic message can be stored in a database that can be accessible by a second analytical computer system that does not have to be in direct communications with the first analytical computer system. The processes and procedures that are described herein can be actuated by a computer processor that executes computer readable instructions to provide the functionality herein.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A computerized system for analysis of vertices and edges of an electronic messaging system comprising:
a computer system having a processor and in communications with a recipient electronic message system and is configured to actuate computer readable instructions to:
receive an electronic message prior to the electronic message being delivered to a recipient client and the recipient electronic message system, wherein the electronic message is sent from a sender electronic message system,
designate a sender as a first node in a relationship network,
designate a recipient as a second node in the relationship network,
determine an edge value prior to the electronic message being delivered to the recipient electronic message system, wherein the edge value is associated with the first node and the second node according to attributes taken from the group consisting of a sender identification, recipient identification, a message time, an internet protocol (IP) address associated with the electronic message, a reverse domain name system (DNS) associated with the IP address, a geographic region associated with the sender, a domain associated with the sender, a sender electronic message client, a size of the electronic message, a velocity associated with the electronic message, an attachment to the electronic message, an electronic messaging character encoding and any combination thereof,
receive an event performed on the electronic message, wherein the event comprising moving the electronic message out of a spam folder,
modify the edge value according to the event by increasing or decreasing the edge value,
perform an action according to the modified edge value associated with the electronic message prior to delivery of the electronic message to the recipient client and the recipient electronic message system, wherein the action is taken from the group consisting of moving the electronic message to the spam folder, and quarantining the electronic message on the computer system.

2. The system of claim 1 wherein the geographic region associated with the sender is a sender device geographic region.

3. The system of claim 1 wherein the geographic region associated with the sender is a sender IP geographic region.

4. The system of claim 1 wherein a receipt of the electronic message includes retrieving the electronic message from an electronic message server prior to the delivery of the electronic message to the recipient client.

5. The system of claim 1 wherein the computer system is configured to create a set of rules taken from the group consisting of adding the sender to a white list, add the sender to a blocked list, allowing a sender's domain according to the white list, blocking the sender's domain, allow a sender's IP address to the white list, block the sender's IP address, add a sender's geographic region to the white list, block the sender's geographic region, and any combination thereof.

6. The system of claim 1 wherein the electronic message is provided to the recipient client and the recipient client is configured to determine electronic message status according to an attribute taken from the group consisting of the electronic message was opened, the electronic message was not opened, the electronic message was deleted, the electronic message was moved to a non-inbox folder, a reply was generated to the electronic message, the recipient unsubscribed, the electronic message is on a blocked list, and any combination thereof.

7. The system of claim 1 wherein the computer system is configured to retrieve the electronic message from a mail server and modify the edge value associated between the first node and the second node according to the retrieved electronic messages.

8. The system of claim 7 wherein the computer system is configured to modify the edge value according to a set of electronic messages transmitted between a sender's client and the recipient client.

9. The system of claim 1 wherein the edge value is a first edge value, and the computer system is configured to retrieve a relationship information between the sender and the recipient from a third-party computer system and determine a second edge value associated between the first node and the second node according to the relationship information.

10. The system of claim 9 wherein the third-party computer system is taken from the group consisting of a social media computer system, scheduling computer system, access control computer system, white list computer system, black list computer system, and any combination thereof.

11. The system of claim 1 wherein the edge value is a first edge value, and the computer system is configured to determine a second edge value associated between the first node and the second node according to the velocity associated with the electronic message.

12. The system of claim 1 wherein the edge value is a first edge value, and the computer system is configured to determine a second edge value associated between the first node and the second node according to a set of recipients receiving similar versions of the electronic message.

13. The system of claim 1 wherein the computer system is configured to determine a confidence value according to the edge value.

14. The system of claim 1 wherein the computer system is configured to modify the edge value between the first node and the second node according to a volume of electronic message sent between the sender and recipient.

15. A computerized system for analysis of vertices and edges of an electronic messaging system comprising:
a computer system having a processor and in communications with a recipient electronic message system and is configured to actuate computer readable instructions to:
receive an electronic message sent from a sender electronic message system prior to the electronic message being delivered to the recipient electronic message system,
designate a sender as a first node in a relationship network,
designate a recipient as a second node in the relationship network,
determine an edge value prior to the electronic message being delivered to the recipient electronic message system associated with the first node and the second node according to attributes taken from the group consisting of a sender identification, recipient identification, a message time, an internet protocol (IP) address associated with the electronic message, a reverse domain name system (DNS) associated with the IP address, a geographic region associated with the sender, a domain associated with the sender, a sender electronic message client, a size of the electronic message, a velocity associated with the electronic message, an attachment to the electronic message, an electronic messaging character encoding and any combination thereof,
receive an event performed on the electronic message, wherein the event comprising moving the electronic message out of a spam folder,
modify the edge value according to the event by increasing or decreasing the edge value, and;
perform an action according to the modified edge value associated with the electronic message prior to the electronic message being delivered to the recipient electronic message system, wherein the action is taken from the group consisting of reporting the electronic message as spam to an administrator of the computer system, moving the electronic message to the spam folder transmitting a notification that the electronic message has been sent to the recipient, moving the electronic message out of the spam folder, quarantining the electronic message on the computer system, and any combination thereof.

16. A computerized system for analysis of vertices and edges of an electronic messaging system comprising:
a computer system having a processor and in communications with a recipient electronic message system and is configured to actuate computer readable instructions to:
receive an electronic message sent from a sender electronic message system prior to the electronic message being delivered to the recipient electronic message system,
designate a sender as a first node in a relationship network,
designate a recipient as a second node in the relationship network,
determine an edge value prior to the electronic message being delivered to the recipient electronic message system, wherein the edge value is associated with the first node and the second node according to attributes taken from the group consisting of a sender identification, recipient identification, a message time, an internet protocol (IP) address associated with the electronic message, a reverse domain name system (DNS) associated with the IP address, a geographic region associated with the sender, a domain associated with the sender, a sender electronic message client, a size of the electronic message, a velocity associated with the electronic message, an attachment to the electronic message, an electronic messaging character encoding and any combination thereof,
receive an event performed on the electronic message, wherein the event comprising moving the electronic message out of a spam folder, modify the edge value according to the event by increasing or decreasing the edge value, and;

perform an action according to the modified edge value prior to the electronic message being delivered to the recipient electronic message system associated with the electronic message to the recipient electronic message system, wherein the action is taken from the group consisting of reporting the electronic message as spam to an administrator of the computer system, moving the electronic message to the spam folder, transmitting a notification to the recipient that an email has been sent to the recipient, moving the electronic message out of the spam folder, quarantining the electronic message, and any combination thereof.

* * * * *